I. Anderson,
Hay Loader.
No. 95,408. Patented Oct. 5, 1869.
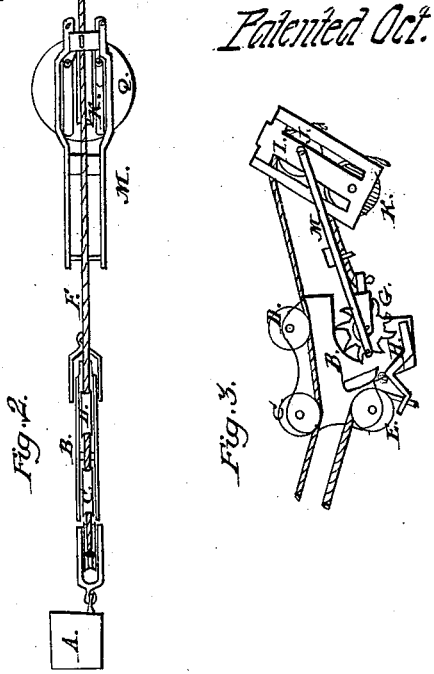
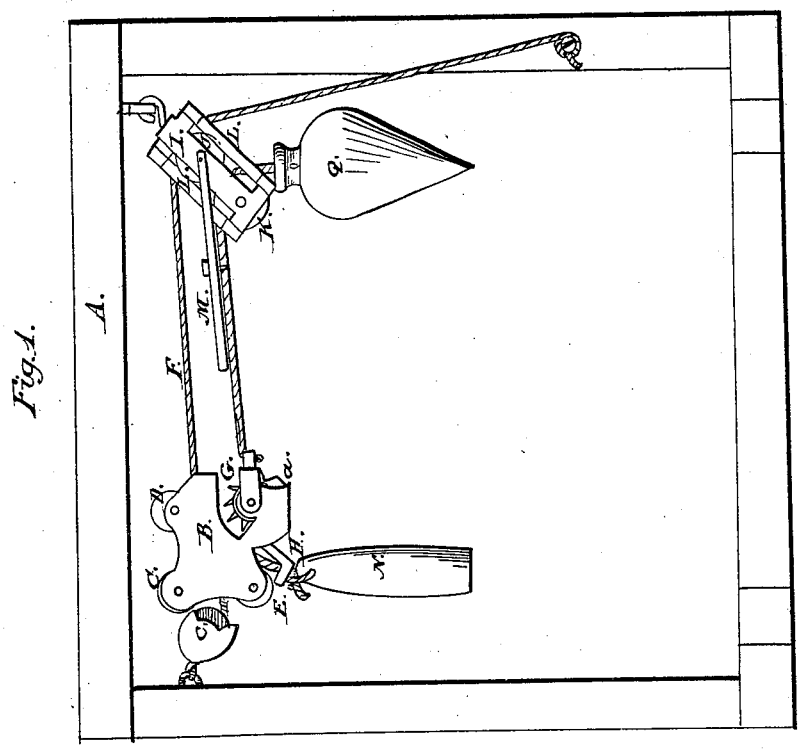
Witnesses:
J. W. Burridge
D. L. Humphreys
Inventor:
I. Anderson

United States Patent Office.

ISAAC ANDERSON, OF POLAND, OHIO.

Letters Patent No. 95,408, dated October 5, 1869.

---

IMPROVEMENT IN HAY-LOADER.

---

The Schedule referred to in these Letters Patent and making part of the same.

---

*To all whom it may concern:*

Be it known that I, ISAAC ANDERSON, of Poland, in the county of Mahoning, and State of Ohio, have invented certain new and useful Improvements in Hay-Loaders; and I do hereby declare that the following is a full and complete description of the same, reference being had to the accompanying drawings, in which—

Figure 1 is a side view of the apparatus.
Figure 2, a view of the top.
Figure 3, a detached section.

Like letters of reference refer to like parts in the several views presented.

This invention has for its object the unloading of hay, &c., from a wagon on to the bay or stack, by the employment of a lifting and carrying-device, consisting of ropes and pulleys, constructed and operated in the manner as hereinafter described.

In fig. 1, A represents a frame or barn, to which the apparatus is attached, consisting of a block, B, in which are secured the pulleys C D E, over and around which runs the rope F, to which further reference will be made.

In the lower angle of the block is pivoted a toothed wheel, G, also a trip, H, the purpose of which will hereinafter be shown.

I is a frame or block, in which the pulleys J K are secured.

It will be observed that each of the four corners of said frame is provided with a roller, L, the use of which will presently be shown.

M is a yoke, one end of which is pivoted to the frame I, whereas the opposite or free end reaches forward, and engages in the teeth of the wheel G, as shown in fig. 3.

To one end of the rope F is attached a hay-fork, represented by the weight N, the rope proceeding thence over the pulley E to and around the pulley O; thence, under the pulleys C D, to and over the pulleys P in the block I; from thence to the horse or team whereby the machine is operated.

The practical operation of this apparatus is as follows:

It is suspended in the barn, as shown in the drawing, in which the block and fork is represented as being over the bay or stack. From this position the fork is drawn down to the load of hay, supposed to be standing by the side of the bay or other place of deposit.

On thus being drawn down, the block rolls along upon the rope until the wheel G reaches the yoke, the end of which immediately slides upon and is caught by the teeth of the wheel, and thereby prevented from being drawn back by the dog or trip H, by the end *a* of which falling into a tooth of the wheel at the lower side, thus locking it, and preventing the loaded fork from falling while being raised from the load.

The fork and block, thus locked, is shown in fig. 3, which is lifted by the team drawing upon the rope F until the upper end of the fork comes in contact with the loop-end of the trip through which the rope is run. By this engagement of the fork with the trip, the opposite end is dislodged from the wheel, which will now revolve and release the yoke therefrom, and allow the loaded fork to be moved over on to the hay, the block rolling along upon the rope, which is rendered taut by the drawing of the team.

The contents of the fork is now discharged by springing the trip of the fork in the usual way, and the apparatus returned to the load by being drawn back by the weight, and to be again loaded and drawn up as before.

The purpose of the friction-rollers L, above referred to, is to prevent the wearing of the rope as it may be drawn across the corners, which it is liable to be in consequence of the movements of the team being from a right line with the movement of the block B, hence by this means the rope will run easier and with much less abrasion, and will therefore wear longer than when drawn across a rigid corner or corners.

What I claim as my invention, and desire to secure by Letters Patent, is—

The wheel G and trip H, as arranged, in combination with yoke M, block B, and block I, substantially as and for the purpose set forth.

ISAAC ANDERSON.

Witnesses:
J. H. BURRIDGE,
W. H. BURRIDGE.